United States Patent
Liu et al.

(10) Patent No.: US 9,516,518 B2
(45) Date of Patent: Dec. 6, 2016

(54) METHOD AND DEVICE FOR PERFORMING MDT MEASUREMENT CONFIGURATION

(71) Applicant: China Academy of Telecommunications Technology, Beijing (CN)

(72) Inventors: Aijuan Liu, Beijing (CN); Yan Wang, Beijing (CN); Nan Yan, Beijing (CN); Jing Liang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/417,853

(22) PCT Filed: Jul. 19, 2013

(86) PCT No.: PCT/CN2013/079659
§ 371 (c)(1),
(2) Date: Jan. 28, 2015

(87) PCT Pub. No.: WO2014/019455
PCT Pub. Date: Feb. 6, 2014

(65) Prior Publication Data
US 2015/0230104 A1     Aug. 13, 2015

(30) Foreign Application Priority Data

Jul. 30, 2012   (CN) .......................... 2012 1 0266560

(51) Int. Cl.
*H04M 3/00* (2006.01)
*H04W 24/02* (2009.01)
(Continued)

(52) U.S. Cl.
CPC ............... *H04W 24/02* (2013.01); *H04W 8/10* (2013.01); *H04W 8/20* (2013.01); *H04W 24/10* (2013.01); *H04W 8/08* (2013.01); *H04W 88/005* (2013.01)

(58) Field of Classification Search
CPC .............................. H04W 24/10; H04W 36/00
(Continued)

(56) References Cited

U.S. PATENT DOCUMENTS

| | | | | |
|---|---|---|---|---|
| 2011/0222511 A1* | 9/2011 | Weng | .................... | H04L 41/085 370/331 |
| 2011/0319115 A1* | 12/2011 | Racz | .................... | H04W 24/10 455/514 |
| 2014/0064132 A1* | 3/2014 | Liu | ....................... | H04W 24/10 370/252 |

FOREIGN PATENT DOCUMENTS

| | | |
|---|---|---|
| CN | 102202284 A | 9/2011 |
| CN | 102271322 A | 12/2011 |

(Continued)

OTHER PUBLICATIONS

3GPP TS 32.422 V10.4.0 (Jun. 2011); 3rd Generation Partnership Project; Technical Specification Group Services and System Aspects; Telecommunication management; Subscriber and equipment trace; Trace control and configuration management (Release 10).

(Continued)

*Primary Examiner* — Thomas Lett
(74) *Attorney, Agent, or Firm* — Kilpatrick Townsend & Stockton LLP

(57) ABSTRACT

Disclosed are a method and device for performing MDT measurement configuration. The method includes: after receiving a notification of a change of subscription information about a user equipment, an MME storing a PLMN list for the user equipment to perform MDT measurement carried in the notification; and after receiving a notification for activating MDT measurement of the user equipment, the (Continued)

MME sending a trace start message to a serving base station of the user equipment, wherein the trace start message carries the PLMN list for the user equipment to perform MDT measurement.

9 Claims, 13 Drawing Sheets

(51) Int. Cl.
*H04W 24/10* (2009.01)
*H04W 8/10* (2009.01)
*H04W 8/20* (2009.01)
*H04W 8/08* (2009.01)
*H04W 88/00* (2009.01)

(58) Field of Classification Search
USPC .......................................................... 455/418
See application file for complete search history.

(56) References Cited

FOREIGN PATENT DOCUMENTS

| WO | 2012073716 A1 | 6/2012 |
|---|---|---|
| WO | 2012096403 A1 | 7/2012 |

OTHER PUBLICATIONS

The Office Action issued on Dec. 25, 2015 in the CN counterpart application (201210266560.2).
3GPP: "3rd Generation Partnership Project; Technical Specification Group Services and System Aspects; Telecommunication management; Subscriber and equipment trace; Trace control and configuration management (Release 11)", 3GPP Draft; Draft 32422-B40, 3rd Generation Partnership Project (3GPP), Mobile Competence Centre ; 650, Route Des Lucioles ; F-06921 Sophia-Antipolis Cedex ; France, Jun. 27, 2012 (Jun. 27, 2012), XP050647694, [retrieved on Jun. 27, 2012].
Huawei: "Add MDT support for EPLMN scenario", 3GPP Draft; S5-113030 CR 32.422 R11 Add MDT Support for EPLMN, 3rd Generation Partnership Project (3GPP), Mobile Competence Centre ; 650, Route Des Lucioles ; F-06921 Sophia-Antipolis Cedex ; France, vol. SA WG5, No. China; Oct. 10, 2011, Oct. 2, 2011 (Oct. 2, 2011), XP050551855, [retrieved on Oct. 2, 2011].
The Extended European Search Report issued on Sep. 7, 2015 in the EP counterpart application (13826445.2).
International Search Report and Written Opinion for PCT/CN2013/079659 (English and Chinese).

\* cited by examiner

METHOD AND DEVICE FOR PERFORMING MDT MEASUREMENT CONFIGURATION

This application is a US National Stage of International Application No. PCT/CN2013/079659, filed 19 Jul. 2013, designating the United States, and claiming priority to Chinese Patent Application No. 201210266560.2, filed with the State Intellectual Property Office of the People's Republic of China on Jul. 30, 2012 and entitled "Method and device for performing MDT measurement configuration", which is hereby incorporated by reference in its entirety.

FIELD OF THE INVENTION

The present invention relates to the field of wireless communications, and particularly to a method and a device for performing MDT measurement configuration.

BACKGROUND OF THE INVENTION

In mobile communication systems, such as a Long Term Evolution (LTE) system, it is desired to introduce a network self-optimizing mechanism to reduce human intervention in network plan, operation and maintenance, and automatically optimize parameters by a network according to statistics to reduce the construction and operation costs of the network. In order to reduce the operation and maintenance costs of the network, it is desired to adopt a method of reporting by configuring User Equipment (UE) through the network, in order to reduce the artificial drive test work. On the other hand, it is also desired to acquire wireless measurement information of an area incapable of being approached by common drive tests.

Currently, the UE may perform Minimization of Drive-Tests (MDT) measurement in multiple Public Land Mobile Networks (PLMNs). If certain UE is subscribed to allow the MDT measurement to be performed (i.e., the UE has a user consent which is user consent information, and herein it indicates that the UE may perform or is allowed to perform the MDT measurement), then when the UE initially accesses to the network and in an S1 switching process, an Mobility Management Entity (MME) will send the user consent and MDT PLMN LIST (i.e., an MDT PLMN list, which lists the PLMN in which the UE may perform the MDT measurement) to a base station, the base station stores the information and needs to configure according to the MDT PLMN LIST when needing to activate the MDT measurement configuration of the UE subsequently.

SUMMARY OF THE INVENTION

Embodiments of the present invention provide a method and a device for performing MDT measurement configuration, and a solution of MDT measurement configuration is provided aiming at the scenario that when initially accessing to a network, UE is not subscribed to perform MDT measurement, but at a connected state, subscription information changes, and the UE is allowed to perform the MDT measurement. In this way, an MME and an eNB can avoid wrong configuration operation, and in the case of operation failure, a network side may acquire a failure reason so as to correctly process the failure.

An embodiment of the present invention provides a method for performing MDT measurement configuration, including: storing, by an MME, a PLMN list of a user equipment for performing MDT measurement carried in a notification of change of subscription information of the user equipment, after receiving the notification; sending, by the MME, a Trace Start message to a serving base station of the user equipment, after receiving a notification of activating the MDT measurement of the user equipment, where the PLMN list of the user equipment for performing the MDT measurement is carried in the Trace Start message.

An embodiment of the present invention provides an MME device, including: a subscription information processing component configured to, store a public land mobile network PLMN list of a user equipment for performing MDT measurement carried in a notification of change of subscription information of the user equipment, after receiving the notification; an MDT measurement configuring component configured to, after receiving a notification of activating the MDT measurement of the user equipment, send a Trace Start message to a serving base station of the user equipment, where the PLMN list of the user equipment for performing the MDT measurement is carried in the Trace Start message.

In the above-mentioned embodiments of the present invention, the MME carries the PLMN list of the user equipment for performing the MDT measurement in a Trace Start message for notifying the base station to activate the MDT measurement configuration, in order to enable the base station to perform the MDT measurement configuration on the user equipment, such that a solution of MDT measurement configuration is provided aiming at the scenario that when initially accessing to a network, UE is not subscribed to perform MDT measurement, but at a connected state, subscription information changes, and the UE is allowed to perform the MDT measurement. In this way, the MME and an eNB can avoid wrong configuration operation; in the case of operation failure, a network side may acquire a failure reason so as to correctly process the failure.

An embodiment of the present invention further provides a method for performing MDT measurement configuration, including: inquiring, by a base station, a PLMN list of a user equipment for performing MDT measurement, after receiving a Trace Start message sent by an MME; if the PLMN list of the user equipment for performing the MDT measurement is not inquired, sending a Trace Start failure message to the MME, or configuring the user equipment to perform the MDT measurement under the current PLMN of the user equipment.

An embodiment of the present invention further provides a base station device, including: an inquiring component configured to inquire a public land mobile network PLMN list of a user equipment for performing MDT measurement, after receiving a Trace Start message sent by an MME; an MDT measurement configuring component configured to, if the PLMN list of the user equipment for performing the MDT measurement is not inquired, send a Trace Start failure message to the MME, or configure the user equipment to perform the MDT measurement under the current PLMN of the user equipment.

In the above-mentioned embodiments, after receiving the Trace Start message sent by the MME, the base station inquires the PLMN list of the user equipment for performing the MDT measurement, and when the PLMN list of the user equipment for performing the MDT measurement is not inquired, the base station sends the Trace Start failure message to the MME, or configures the user equipment to perform the MDT measurement under the current PLMN of the user equipment, such that a solution of MDT measurement configuration is provided aiming at the scenario that when initially accessing to a network, UE is not subscribed to perform MDT measurement, but at a connected state, subscription information changes, and the UE is allowed to perform the MDT measurement. In this way, the MME and an eNB may avoid wrong configuration operation; in the case of operation failure, a network side may acquire a failure reason so as to correctly process the failure.

An embodiment of the present invention further provides another method for performing MDT measurement configuration, including: after receiving a notification of change of subscription information of a user equipment, storing, by an MME, current user consent information used for indicating that the user equipment is allowed to perform MDT measurement and a public land mobile network, PLMN, list of the user equipment for performing the MDT measurement, which are carried in the notification; after receiving a notification of activating the MDT measurement of the user equipment, finding out, by the MME, that the subscription information of the user equipment changes from performing no MDT measurement into being allowed to perform the MDT measurement, refusing to send a Trace Start message to a serving base station of the user equipment, or sending the Trace Start message carrying the PLMN list of the user equipment for performing the MDT measurement to the serving base station of the user equipment.

An embodiment of the present invention further provides another MME device, including: a subscription information processing component configured to, after receiving a notification of change of subscription information of a user equipment, store current user consent information used for indicating that the user equipment is allowed to perform MDT measurement and a public land mobile network PLMN list of the user equipment for performing the MDT measurement, which are carried in the notification; an MDT measurement configuring component configured to, after receiving a notification of activating the MDT measurement of the user equipment, find out that the subscription information of the user equipment changes from performing no MDT measurement into being allowed to perform the MDT measurement, and refuse to send a Trace Start message to a serving base station of the user equipment, or send the Trace Start message carrying the PLMN list of the user equipment for performing the MDT measurement to the serving base station of the user equipment.

In the above-mentioned embodiments, after receiving the notification of change of the subscription information of the user equipment, the MME inquires the current information and the historical information of the user consent of the user equipment, or inquires a user consent change mark to find out that the user consent information of the user equipment changes from performing no MDT measurement into performing the MDT measurement when the user equipment is at the connected state, refuses to send the Trace Start message to the serving base station of the user equipment, or sends the Trace Start message carrying the PLMN list of the user equipment for performing the MDT measurement to the serving base station of the user equipment, such that a solution of MDT measurement configuration is provided aiming at the scenario that when initially accessing to a network, UE is not subscribed to perform MDT measurement, but at a connected state, subscription information changes, and the UE is allowed to perform the MDT measurement. In this way, the MME and an eNB can avoid wrong configuration operation; in the case of operation failure, a network side may acquire a failure reason so as to correctly process the failure.

DETAILED DESCRIPTION OF THE EMBODIMENTS

To make the technical solutions and advantages of the present invention clearer, the present invention will be further described in detail below in combination with the drawings and specific embodiments.

Figure 1:
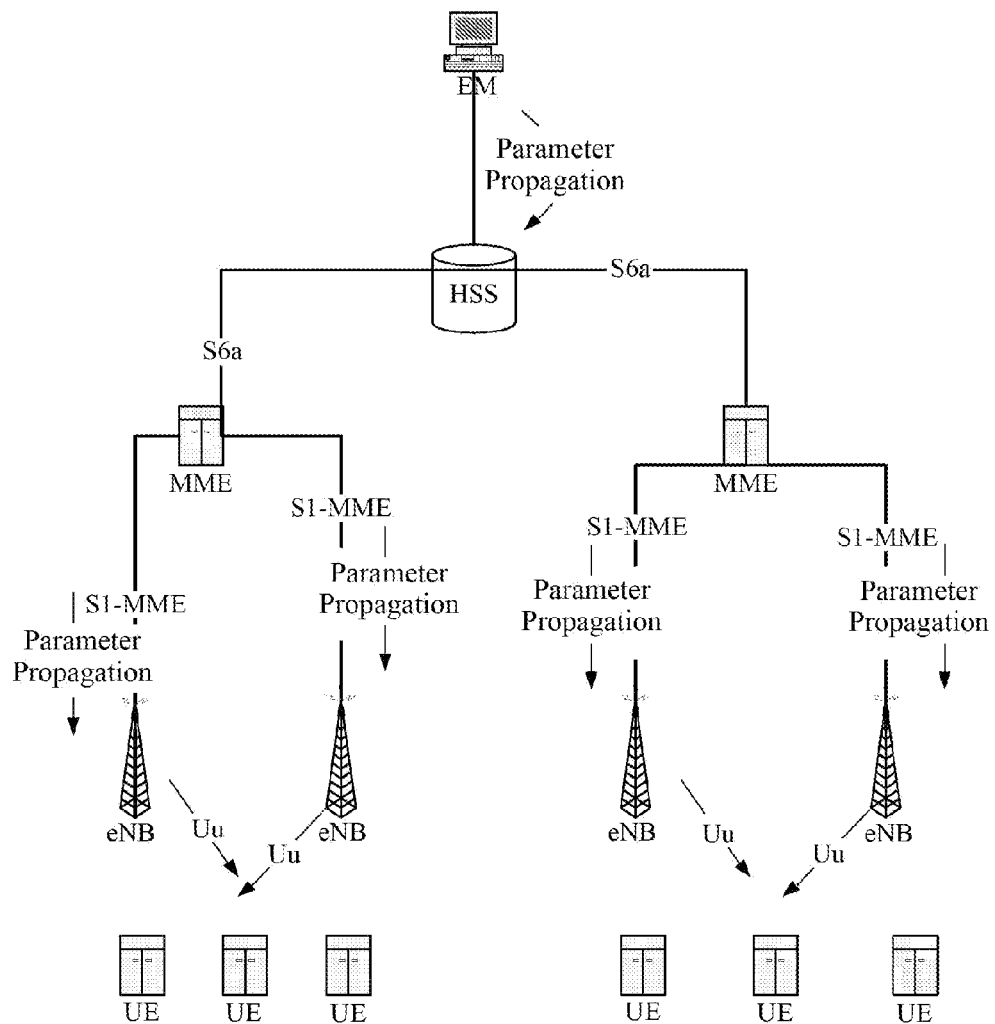
FIG. 1 is a schematic diagram of MDT measurement configuration.

MDT measurement configuration may be divided into measurement based on cells and measurement based on UE. FIG. 1 is a schematic diagram of transmitting MDT configuration parameters based on the UE, wherein an MME may acquire MDT configuration parameters (including Immediate MDT and Logged MDT) relevant to the UE from a Home Subscriber Server (HSS). These configuration parameters may be a group of International Mobile Subscriber Identification Number (IMSI)/International Mobile Equipment Identity (IMEI), and may also contain a certain geographic range (e.g., a Trace Area (TA)/cell list). The MME sends these configuration parameters to the corresponding UE through an evolution NodeB (eNB, i.e., base station), wherein the Immediate MDT and the Logged MDT are two types of MDT measurement. The Immediate MDT refers to the MDT measurement and report performed by a UE at a connected state, the Logged MDT refers to the MDT measurement performed by a UE at an idle state, and report subsequently performed by the UE when at the connected state.

Figure 2:
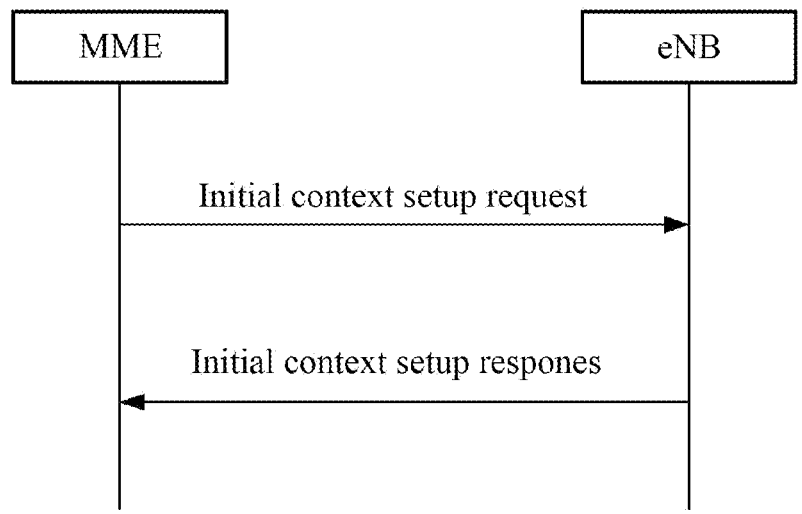
FIG. 2 is a schematic flow chart of MDT measurement configuration when UE initially accesses to a network.

When the UE initially accesses to a network, as shown in FIG. 2, the MME requests the base station to set up a UE context through an Initial context setup request message, if the UE may be subscribed to allow the MDT measurement to be performed, the message will carry USERCONSENT IE (i.e., a USER CONSENT Information Element, which indicates that the UE may perform the MDT measurement) and MDT PLMN LIST IE (i.e., an MDT PLMN LIST Information Element, which indicates that the UE needs to perform the MDT measurement under these PLMN).

Figure 3:
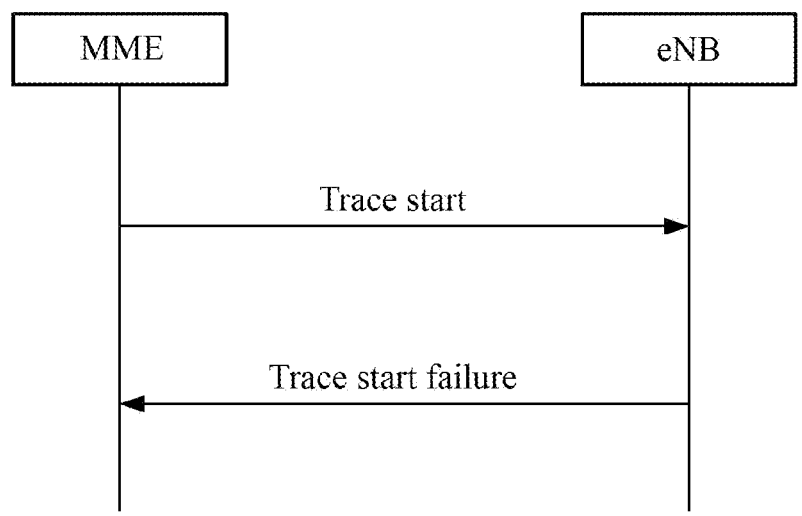
FIG. 3 is a schematic flow chart of MDT measurement configuration of UE at a connected state.

For the UE at the connected state, as shown in FIG. 3, the MME notifies the eNB to activate the MDT measurement configuration of the UE through a Trace Start message, and the message will carry the MDT measurement needing to be performed, an MDT measurement mark and a cell or TA or the like to perform the MDT measurement. If the eNB could not activate the MDT measurement of the UE due to some reasons, the eNB needs to notify the MME through a Trace Start failure message.

When initially accessing to the network, if the UE is not subscribed to allow the MDT measurement to be performed (at this time, the subscription information of a user indicates that the UE does not agree to perform the MDT measurement), however, when the UE is at the connected state, the subscription information changes, the UE agrees to perform the MDT measurement, and the changed subscription information (including new user consent and MDT PLMN LIST) is sent by the HSS to the MME. Since under this scenario, the MME will not send the user consent or the MDT PLMN LIST to the base station, after the HSS activates the MDT measurement, the base station has no MDT PLMN LIST information of the corresponding UE, and this scenario could not be processed by the current communication standard.

In order to solve the above-mentioned problems, embodiments of the present invention provide several different solutions:

solution 1: when notifying the eNB to activate the MDT measurement configuration through the Trace Start message, the MME carries the MDT PLMN LIST, in this way, when acquiring the MDT measurement configuration, the eNB knows the PLMN in which the UE needs to perform MDT, thus the MDT measurement may be accurately activated according to the information.

Solution 2: the MME notifies the eNB to activate the MDT measurement configuration through the Trace Start message, the eNB could not find the MDT PLMN LIST in the UE CONTEXT, at this time, the following two different processing manners may be adopted by the eNB:

(1) the eNB notifies the MME of the MDT measurement configuration activation failure through the Trace Start failure message, and may further notify the MME that the failure reason is that no MDT PLMN LIST of the corresponding UE exists at the eNB side;

(2) the UE is configured to merely perform the MDT measurement under the current PLMN.

Solution 3: the MME stores the user consent information when the UE initially accesses to the network, when the UE is at the connected state, the user consent state changes, the MME stores the historical state of the user consent or sets a mark, in order to indicate that the user consent changes when the UE is at the connected state. Subsequently, when the MME receives a message indicating that the UE performs the MDT measurement, the MME checks the current state and the historical state of the local user consent, or checks the mark, if the check result indicates the above-mentioned scenario (i.e., when initially accessing to the network, the UE is not subscribed to allow the MDT measurement to be performed, when the UE is at the connected state, the subscription information changes, and the UE is allowed to perform the MDT measurement), then one processing method is as follows: the MME determines not to send immediately a message of activating the MDT measurement configuration to the base station, as the MME knows that it is bound to fail to send an MDT activation message to the base station. The other processing method is as follows: the MME sends the Trace Start message to the base station, the message including the MDT PLMN LIST to enable the base station to correctly configure the UE to implement an MDT measurement task.

The above-mentioned solutions will be described in detail below in combination with specific embodiments.

First Embodiment

The scenario of the embodiment is as follows: one UE at an idle state is not subscribed to perform MDT measurement. Since there is a data service, the UE sets up connection with a network side. In a process when the UE is at a connected state, the subscription information of the UE changes and the MDT measurement may be performed. And then, an HSS notifies an MME to activate the MDT measurement of the UE. The MME carries MDT measurement configuration and MDT PLMN LIST in a Trace Start message and issues the message to an eNB. The eNB activates the MDT measurement of the UE according to the information.

Figure 4:
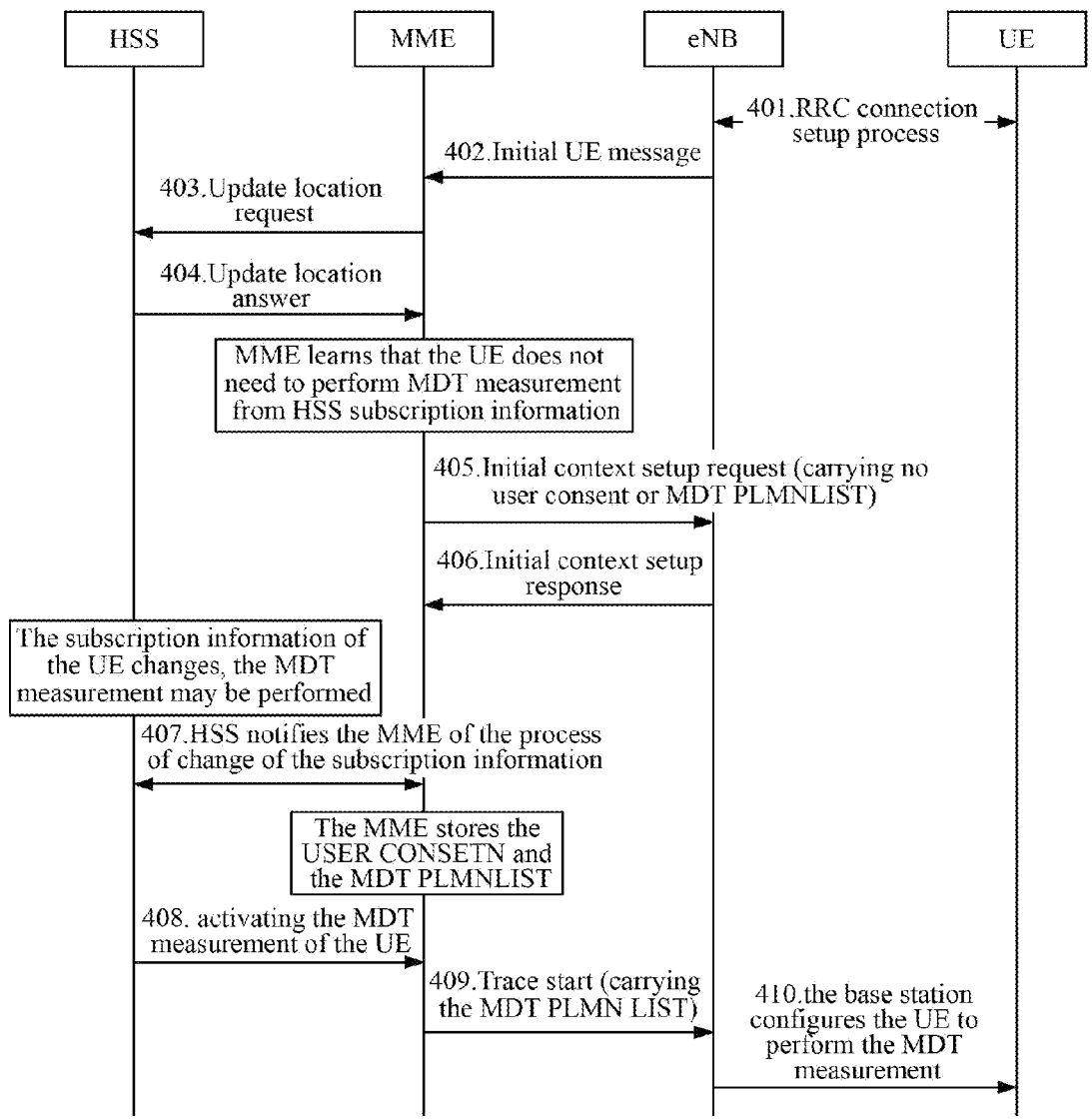
FIG. 4 is a schematic flow chart of performing MDT measurement configuration provided by the first embodiment of the present invention.

FIG. 4 is a schematic flow chart of performing MDT measurement configuration in an embodiment of the present invention. As shown in FIG. 4, the flow may include the following operations:

operation 401, the UE at the IDLE state initiates a Radio Resource Control (RRC) connection setup process to the eNB (i.e., a serving base station of the UE).

Operation 402, after setting up the RRC connection, the eNB sends an Initial UE message to the MME;

operation 403, the MME sends an Update Location Request message to the HSS, to request the HSS to update the location of the UE in the network;

operation 404, after receiving the Update Location Request message, the HSS sends an answer message to the MME, namely, an Update Location Answer message, wherein the message carries subscription information. The MME learns that the UE is not subscribed to perform the MDT measurement through the subscription information;

operation 405, the MME sends an Initial context setup request message to the eNB to request the eNB to set up a UE context;

operation 406, the eNB sets up the UE context, stores the information and sends an Initial context setup response message to the MME.

When the subscription information of the UE at the connected state changes and the UE may perform the MDT measurement, the following operations are implemented:

operation 407, the HSS notifies the MME that the subscription information of the UE changes, and sends the user consent (at this time, indicating that the UE is allowed to perform the MDT measurement) and MDT PLMN LIST of the UE to the MME, and the MME stores the user consent and the MDT PLMN LIST of the UE in the context of the UE. Furthermore, the MME sends answer information to the HHS.

Operation 408, the HSS sends a request of activating the MDT measurement of the UE to the MME;

operation 409, after receiving the request of activating the MDT measurement of the UE sent by the HSS, the MME finds out the MDT PLMN LIST from the stored context of the UE and sends the MDT PLMN LIST of the UE to the eNB by containing the same in the Trace Start message; and operation 410, after receiving the Trace Start message, the eNB performs MDT measurement configuration on the UE according to the MDT measurement configuration and the MDT PLMN LIST in the message.

Second Embodiment

The scenario of the embodiment is as follows: one UE at an idle state is not subscribed to perform MDT measurement. Since there is a data service, the UE sets up connection with a network side. In a process when the UE is at a connected state, the subscription information of the UE changes, and the MDT measurement may be performed. And then, an HSS notifies an MME to activate the MDT measurement of the UE. The MME notifies a base station to activate the MDT measurement through a Trace Start message. Since the base station could not acquire the MDT PLMN LIST of the UE, the base station notifies the MME of MDT measurement activation failure.

Figure 5:
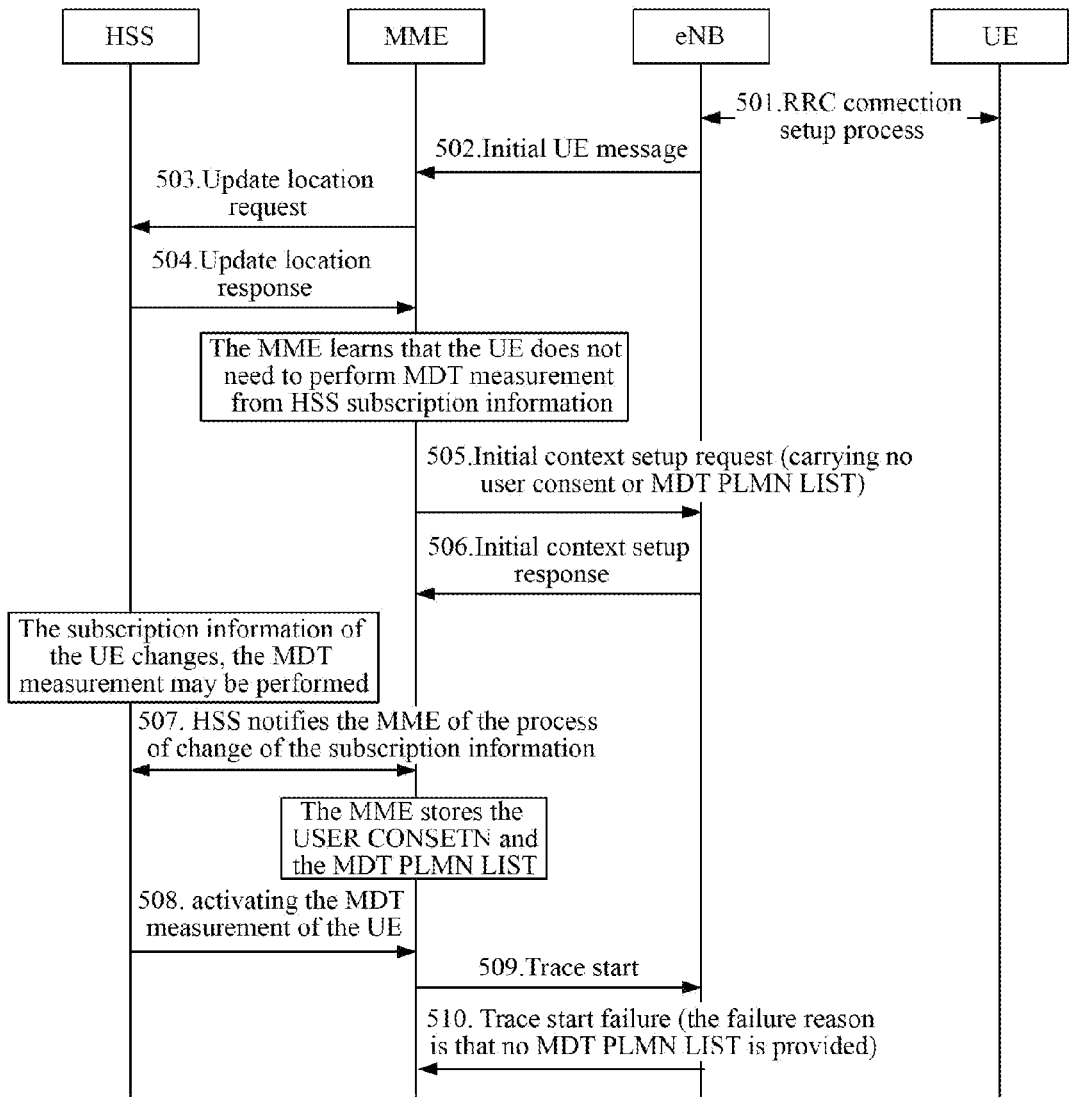
FIG. 5 is a schematic flow chart of performing MDT measurement configuration provided by the second embodiment of the present invention.

FIG. 5 is a schematic flow chart of performing MDT measurement configuration in an embodiment of the present invention. As shown in FIG. 5, the flow may include:

operations 501-506, which are the same as operations 401-406 in the flow as shown in FIG. 4, namely, the UE at the idle state is not subscribed to perform the MDT measurement, since there is a data service, the UE sets up connection with the network side. In the process when the UE is at the connected state, the subscription information of the UE changes, and the MDT measurement may be performed.

When the subscription information of the UE at the connected state changes and the UE may perform the MDT measurement, the following operations are implemented:

operation 507, the HSS notifies the MME that the subscription information of the UE changes, and sends the user consent (at this time, indicating that the UE is allowed to perform the MDT measurement) and MDT PLMN LIST of the UE to the MME, and the MME stores the user consent and the MDT PLMN LIST of the UE in the context of the UE. Furthermore, the MME sends answer information to the HHS.

Operation 508, the HSS sends a request of activating the MDT measurement of the UE to the MME;

operation 509, after receiving the request of activating the MDT measurement of the UE sent by the HSS, the MME notifies the base station to activate the MDT measurement of the UE through the Trace Start message; and operation 510, after receiving the Trace Start message, the base station looks up the MDT PLMN LIST in the stored UE context and finds no MDT PLMN LIST, thus sending a Trace Start failure message to the MME, in order to notify the MME of the MDT measurement configuration failure. Furthermore, the base station may carry a failure reason in the Trace Start failure message, in order to notify the MME that the failure reason is that the MDT PLMN LIST of the UE is not found.

Third Embodiment

The scenario of the embodiment is as follows: one UE at an idle state is not subscribed to perform MDT measurement. Since there is a data service, the UE sets up connection with a network side. In a process when the UE is at a connected state, the subscription information of the UE changes, and the MDT measurement may be performed. And then, an HSS notifies an MME to activate the MDT measurement of the UE. The MME notifies a base station to activate the MDT measurement configuration through a Trace Start message. Since the base station could not acquire the MDT PLMN LIST of the UE, thus configuring the UE to merely perform the MDT measurement under the current PLMN.

Figure 6:
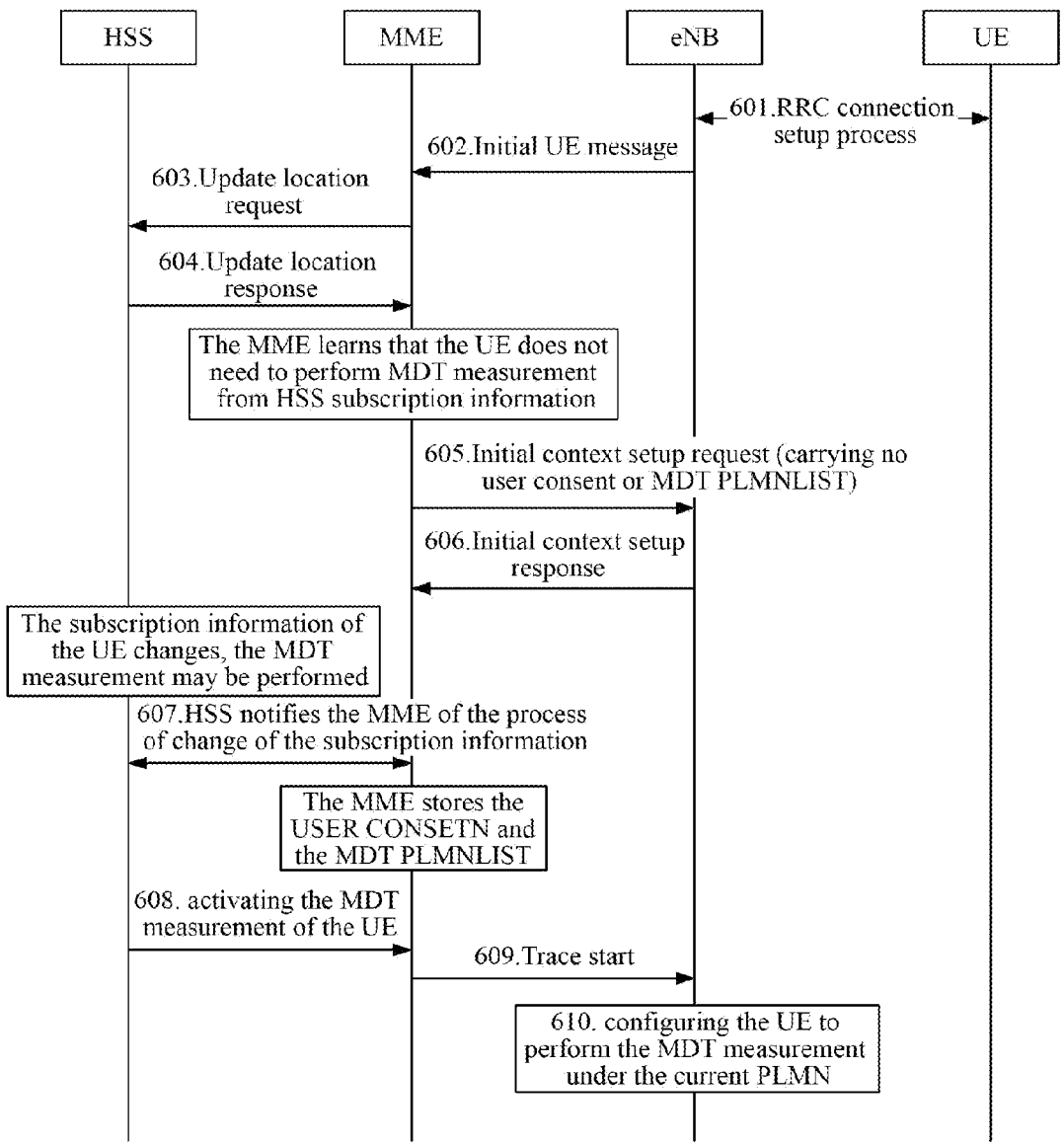
FIG. 6 is a schematic flow chart of performing MDT measurement configuration provided by the third embodiment of the present invention.

FIG. 6 is a schematic flow chart of performing MDT measurement configuration in an embodiment of the present invention. As shown in FIG. 6, the flow may include:

operations 601-606, which are the same as operations 501-506 in the flow as shown in FIG. 5, namely, the UE at the idle state is not subscribed to perform the MDT measurement, since there is a data service, the UE sets up connection with the network side. In the process when the UE is at the connected state, the subscription information of the UE changes, and the MDT measurement may be performed.

When the subscription information of the UE at the connected state changes and the UE may perform the MDT measurement, the following operations are implemented:

operation 607, the HSS notifies the MME that the subscription information of the UE changes, and sends the user consent (at this time, indicating that the UE is allowed to perform the MDT measurement) and MDT PLMN LIST of the UE to the MME, and the MME stores the user consent and the MDT PLMN LIST of the UE in the context of the UE. Furthermore, the MME sends answer information to the HHS.

Operation 608, the HSS sends a request of activating the MDT measurement of the UE to the MME;

operation 609, after receiving the request of activating the MDT measurement of the UE sent by the HSS, the MME notifies the base station to activate the MDT measurement of the UE through the Trace Start message; and operation 610, after receiving the Trace Start message, the base station looks up the MDT PLMN LIST in the stored UE context and finds no MDT PLMN LIST, thus configuring the UE to merely perform the MDT measurement under the current PLMN.

Fourth Embodiment

The scenario of the embodiment is as follows: UE initially accesses to a network, at this time, the subscription information of a user indicates that the UE does not agree to perform MDT measurement. After a period of time, the UE enters a connected state, the subscription information of the user changes, and the UE agrees to perform the MDT measurement. At this time, an HSS transmits new subscription information including user consent (at this time, indicating that the UE is allowed to perform the MDT measurement) and MDT PLMN LIST to an MME.

Figure 7:
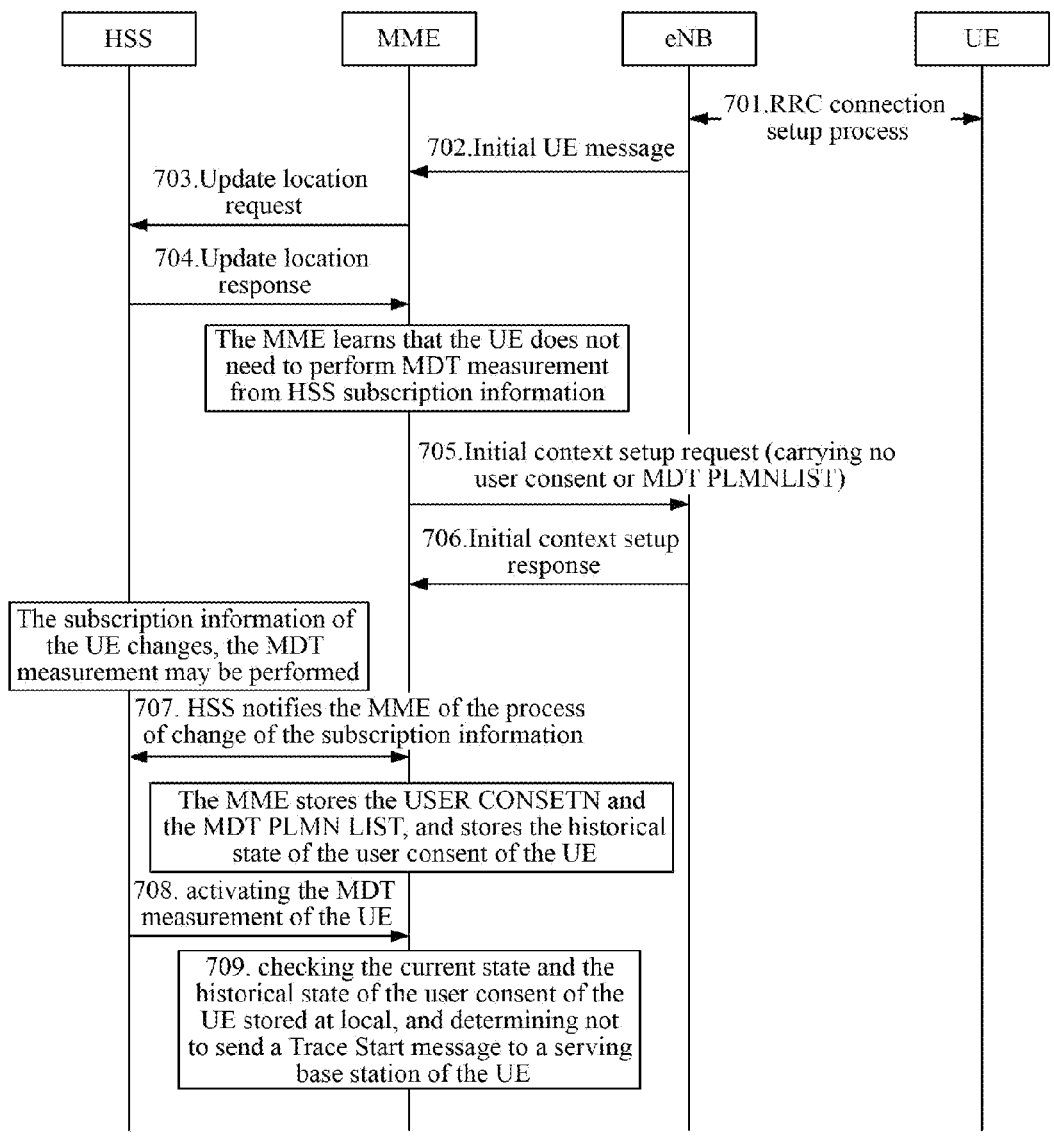
FIG. 7 is a schematic flow chart of performing MDT measurement configuration provided by the fourth embodiment of the present invention.

FIG. 7 is a schematic flow chart of performing MDT measurement configuration in an embodiment of the present invention. As shown in FIG. 7, the flow may include the following operations:

operations 701-706, which are the same as operations 401-406 in the flow as shown in FIG. 4, namely, the UE at the idle state is not subscribed to perform the MDT measurement, since the data service exists, the UE sets up connection with the network side. In the process when the UE is at the connected state, the subscription information of the UE changes, and the MDT measurement may be performed.

When the subscription information of the UE at the connected state changes and the UE may perform the MDT measurement, the following operations are implemented:

operation 707, the HSS notifies the MME that the subscription information of the UE changes, and sends the user consent (at this time, indicating that the UE is allowed to perform the MDT measurement) and the MDT PLMN LIST of the UE to the MME, and the MME stores the user consent and the MDT PLMN LIST of the UE in the context of the UE. Furthermore, the MME sends answer information to the HHS.

After receiving the new subscription information, carrying the user consent and the MDT PLMN LIST, sent by the HSS, the MME updates the old subscription information in the UE context stored at local with the new subscription information, and stores the old user consent information (i.e., the historical state of the user consent, which indicates that the UE performs no MDT measurement) of the UE, in order to indicate that the user consent changes after the UE is connected to the network (i.e., the user consent when the UE is at the idle state indicates that the UE performs no MDT measurement, after the UE enters the connected state, the user consent of the UE changes to indicate that the UE performs the MDT measurement).

Operation 708, the HSS sends a request of activating the MDT measurement of the UE to the MME;

operation 709, after receiving a message of requesting to activate the MDT measurement of the UE sent by the HSS, the MME checks the current state and the historical state of the user consent in the context of the UE stored at local, and if finding that the user consent changes in the duration when the UE is at the connected state (under this condition, the current state of the user consent is that the UE agrees to perform the MDT measurement, and the historical state is that the UE does not agree to perform the MDT measurement), determines not to send the Trace Start message to the serving base station of the UE, because the MME knows that the base station has no MDT PLMN LIST of the UE, and is not able to configure the UE to implement the MDT measurement task.

Fifth Embodiment

Figure 8:
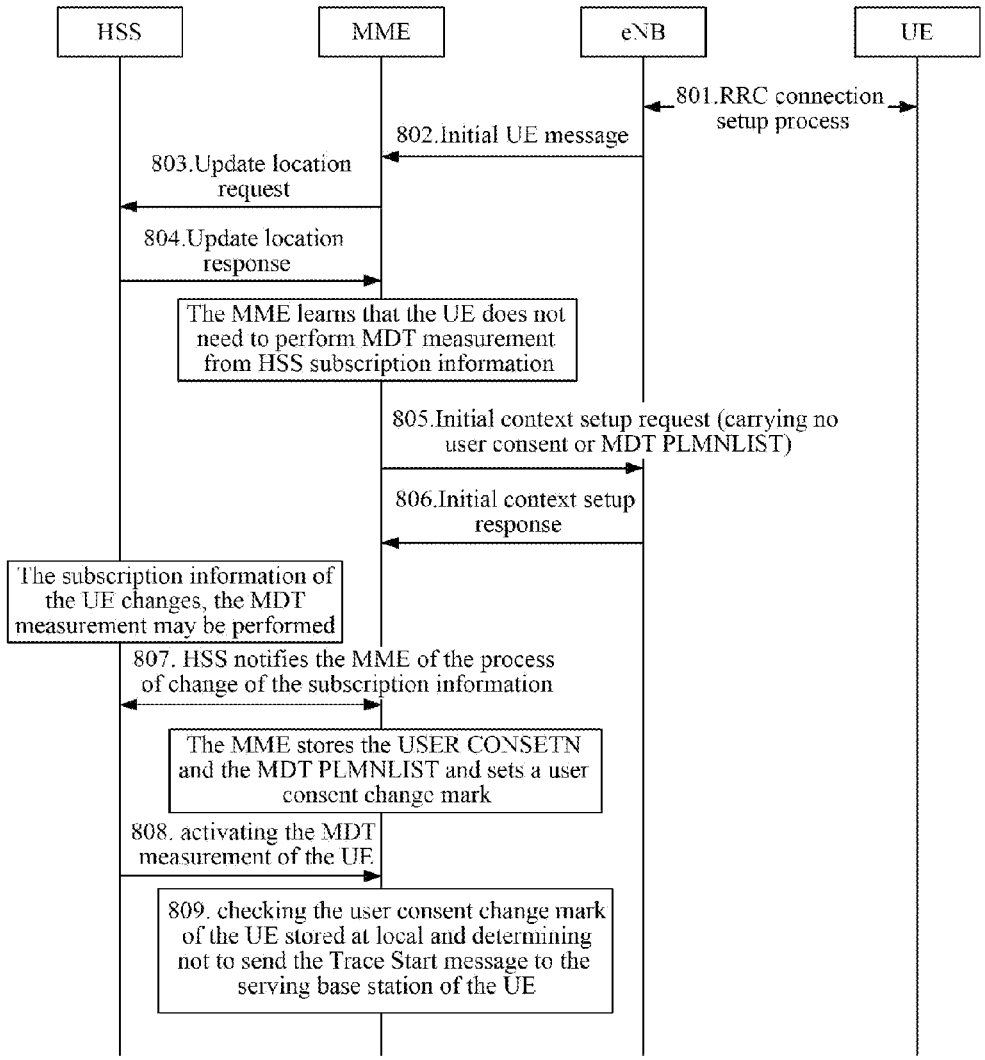
FIG. 8 is a schematic flow chart of performing MDT measurement configuration provided by the fifth embodiment of the present invention.

The scenario of the embodiment is basically the same as that of the fourth embodiment, and the difference lies in that:

as shown in FIG. 8, in operation 807, the HSS notifies the MME that the subscription information of the UE changes, and sends the user consent (at this time, indicating that the UE is allowed to perform the MDT measurement) and MDT PLMN LIST of the UE to the MME, and the MME stores the user consent and the MDT PLMN LIST of the UE in the context of the UE and sets a user consent change mark. Furthermore, the MME sends answer information to the HHS.

After receiving the new subscription information, carrying the user consent and the MDT PLMN LIST, sent by the HSS, and updating the old subscription information in the UE context stored at local with the new subscription information, the MME sets a mark (referred to as a user consent change mark), in order to indicate that the user consent changes after the UE is connected to the network (i.e., the user consent when the UE is at the idle state indicates that the UE performs no MDT measurement, after the UE enters the connected state, the user consent thereof changes to indicate that the UE performs the MDT measurement).

Operation 808, the HSS sends a request of activating the MDT measurement of the UE to the MME;

operation 809, after receiving a message of requesting to activate the MDT measurement of the UE sent by the HSS, the MME checks the user consent change mark of the UE stored at local, and if finding that the user consent changes in the duration when the UE is at the connected state according to the check result, determines not to send the Trace Start message to the serving base station of the UE.

Sixth Embodiment

Figure 9:
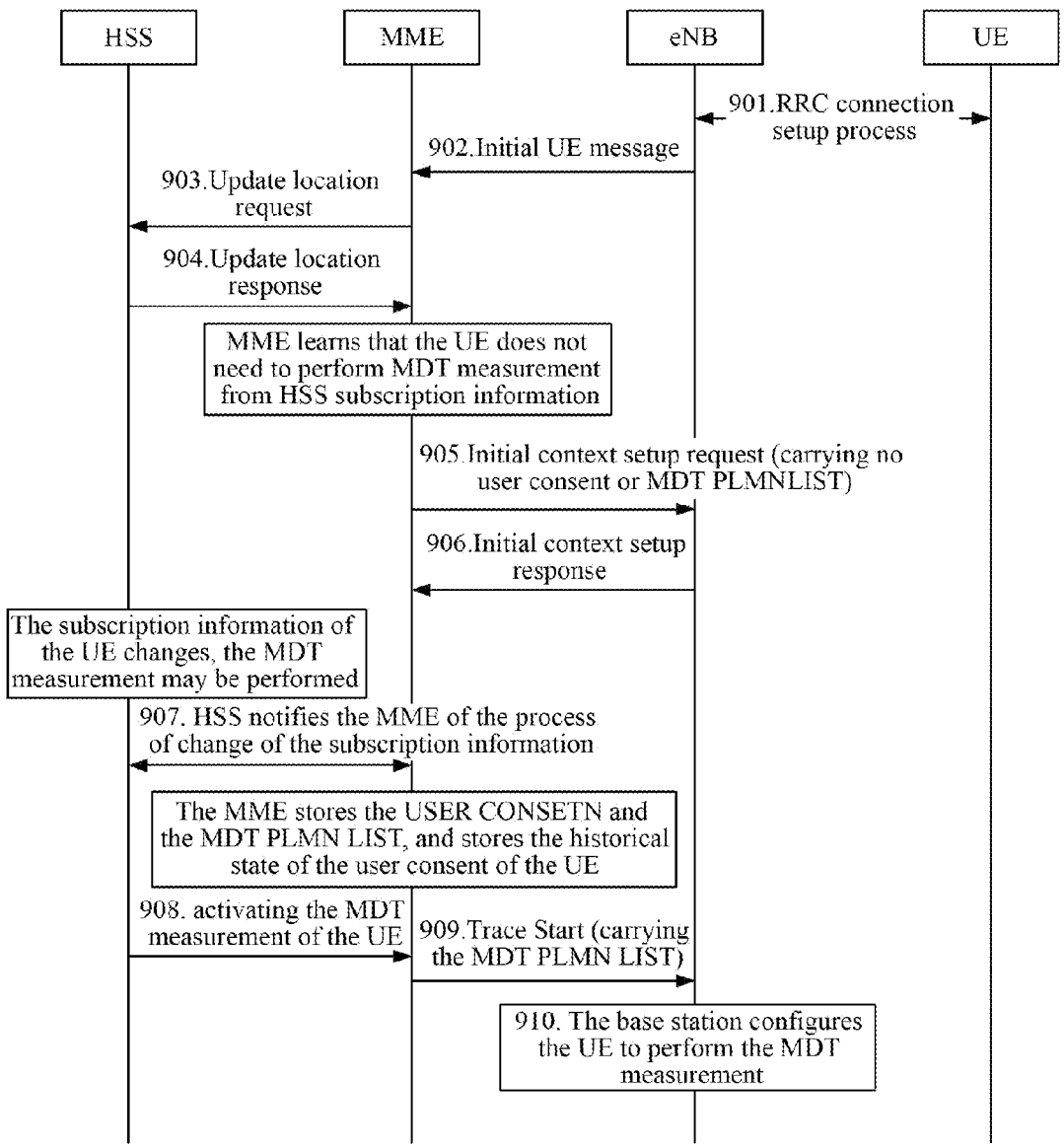
FIG. 9 is a schematic flow chart of performing MDT measurement configuration provided by the sixth embodiment of the present invention.

The scenario of the embodiment is basically the same as that of the fourth embodiment, and the difference lies in that:

as shown in FIG. 9, in operation 909, after receiving the message of requesting to activate the MDT measurement of the UE sent by the HSS, the MME inquires the current state and the historical state of the user consent in the context of the UE, and if finding that the user consent changes in the duration when the UE is at the connected state, sends the Trace Start message to the serving base station of the UE, wherein the message includes the MDT PLMN LIST of the UE.

Operation 910, after receiving the message, the serving base station may correctly configure the UE to perform the MDT measurement.

Seventh Embodiment

Figure 10:
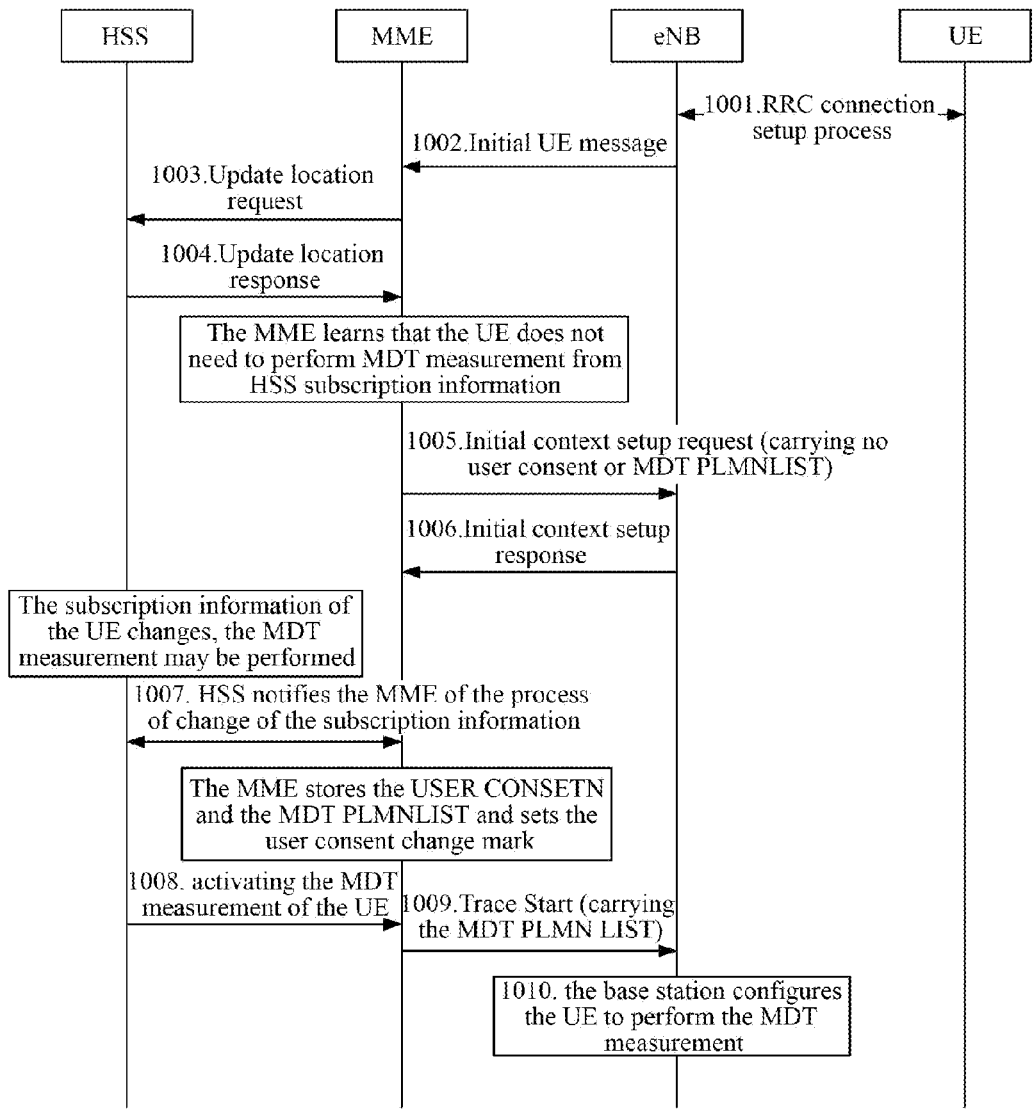
FIG. 10 is a schematic flow chart of performing MDT measurement configuration provided by the seventh embodiment of the present invention.

The scenario of the embodiment is basically the same as that of the fifth embodiment, and the difference lies in that:

as shown in FIG. 10, in operation 1009, after receiving the message of requesting to activate the MDT measurement of the UE sent by the HSS, the MME inquires the user consent change mark of the UE, and if finding that the user consent changes in the duration when the UE is at the connected state, sends the Trace Start message to the serving base station of the UE, wherein the message includes the MDT PLMN LIST of the UE.

Operation 1010, after receiving the message, the serving base station may correctly configure the UE to perform the MDT measurement.

Based on the same technical concept, embodiments of the present invention further provide an MME device and a base station device.

Figure 11A:
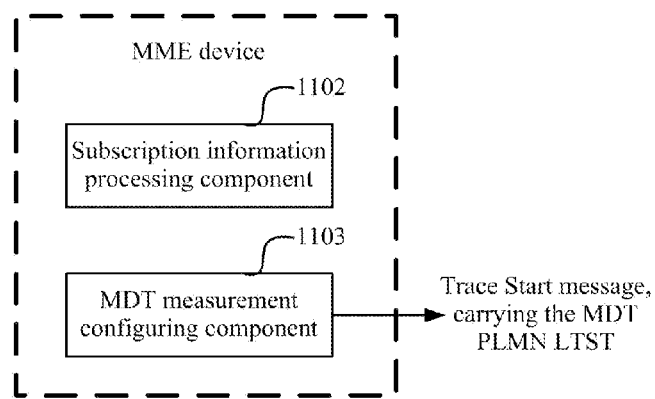
FIG. 11A is a schematic structural diagram of an MME device provided by an embodiment of the present invention.

FIG. 11A is a schematic structural diagram of an MME device provided by an embodiment of the present invention. As shown in FIG. 11A, the MME device includes:

a subscription information processing component 1102 configured to, store a PLMN list of a user equipment for performing MDT measurement carried in a notification of change of subscription information of the user equipment, namely MDT PLMN LIST, after receiving the notification; and an MDT measurement configuring component 1103 configured to, after receiving a notification of activating the MDT measurement of the user equipment, send a Trace Start message to a serving base station of the user equipment, where the PLMN list of the user equipment for performing the MDT measurement is carried in the message, in order to enable the base station to perform MDT measurement configuration on the user equipment according to the PLMN list of the user equipment for performing the MDT measurement carried in the Trace Start message.

Figure 11B:
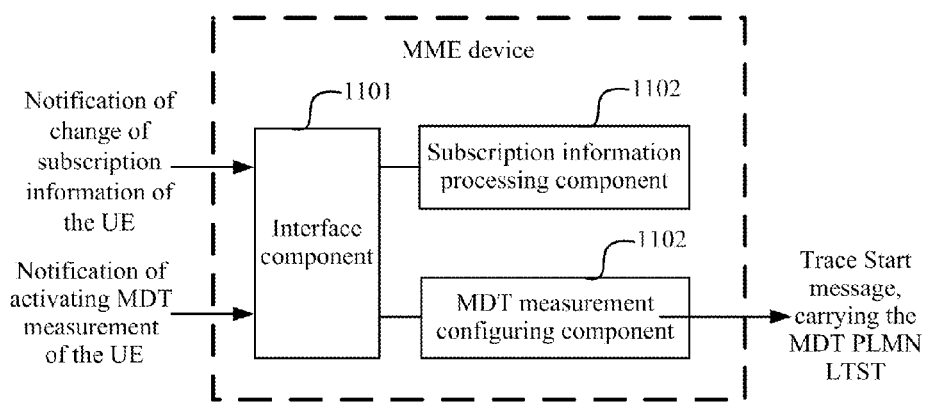
FIG. 11B is a schematic structural diagram of an MME device provided by an embodiment of the present invention.

Further, as shown in FIG. 11B, the MME device may further include an interface component 1101, configured to receive the notification of change of the subscription information of the user equipment and the notification of activating the MDT measurement of the user equipment.

Figure 12:
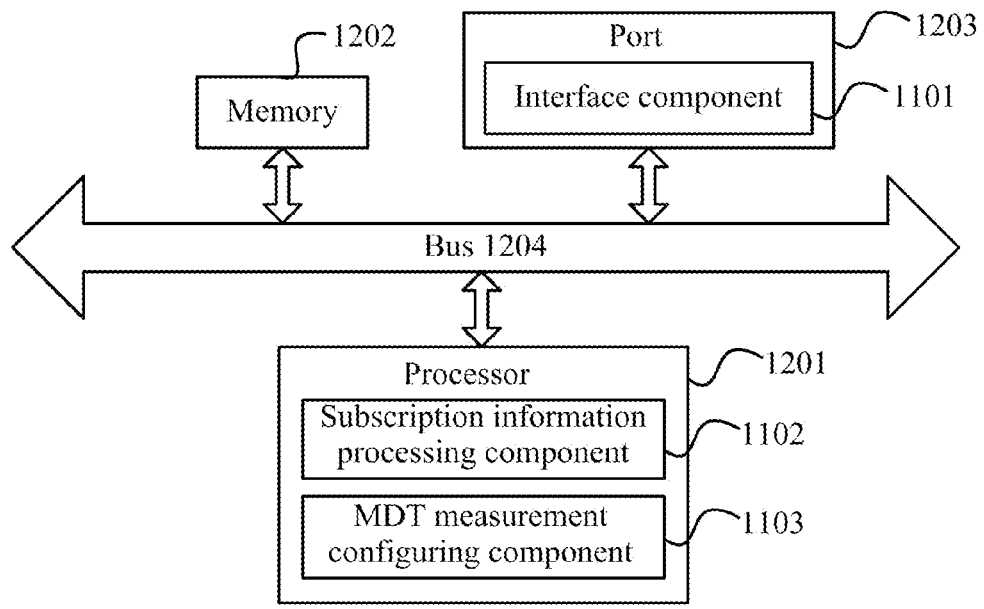
FIG. 12 is a schematic diagram of a hardware structure of an MME device provided by an embodiment of the present invention.

FIG. 12 is a schematic diagram of a hardware structure of an MME device provided by an embodiment of the present invention. As shown in FIG. 12, the MME device includes: a processor 1201, a memory 1202, at least one port 1203 and a bus 1204, where the processor 1201, the memory 1202 and the at least one port 1203 are interconnected through the bus 1204; and the memory 1202 stores machine readable instructions;
the processor 1201 executes the machine readable instructions to implement the following operations:
after receiving a notification of change of subscription information of a user equipment, storing a PLMN list of a user equipment for performing MDT measurement carried in a notification, namely MDT PLMN LIST; and after receiving a notification of activating the MDT measurement of the user equipment, sending a Trace Start message to a serving base station of the user equipment, where the PLMN list of the user equipment for performing the MDT measurement is carried in the message, in order to enable the base station to perform MDT measurement configuration on the user equipment according to the PLMN list of the user equipment for performing the MDT measurement carried in the Trace Start message.

The at least one port 1203 is configured to receive the notification of the change of subscription information of the user equipment and the notification of activating the MDT measurement of the user equipment.

Thus it can be seen that, when the machine readable instructions stored in the memory 1202 is executed by the processor 1201, the functions of the foregoing subscription information processing component 1102 and the MDT measurement configuring component 1103 may be achieved, and the functions of the interface component 1101 are achieved by the at least one port 1203.

Figure 13:
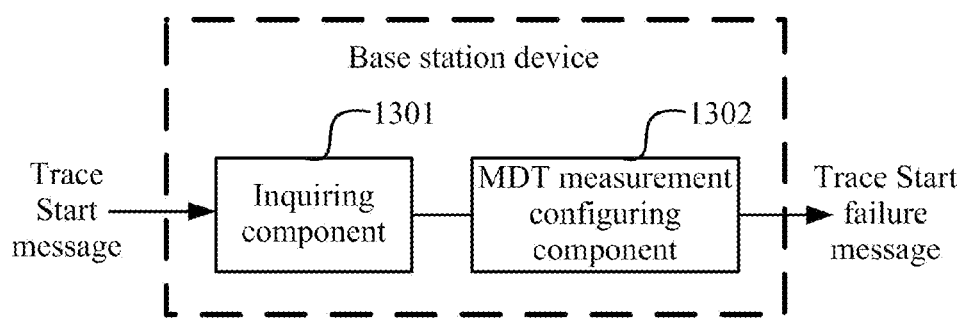
FIG. 13 is a schematic structural diagram of a base station device provided by an embodiment of the present invention.

FIG. 13 is a schematic structural diagram of a base station device provided by an embodiment of the present invention. As shown in FIG. 13, the base station device may include: an inquiring component 1301 configured to inquire a PLMN list of a target user equipment for performing MDT measurement, namely MDT PLMN LIST, after receiving a Trace Start message sent by an MME; and an MDT measurement configuring component 1302 configured to, when the PLMN list of the target user equipment for performing the MDT measurement is not inquired, send a Trace Start failure message to the MME, or configure the target user equipment to perform the MDT measurement under the current PLMN of the target user equipment.

Further, the Trace Start failure message carries a failure reason, and the failure reason is that the PLMN list of the user equipment for performing the MDT measurement is not inquired.

Figure 14:
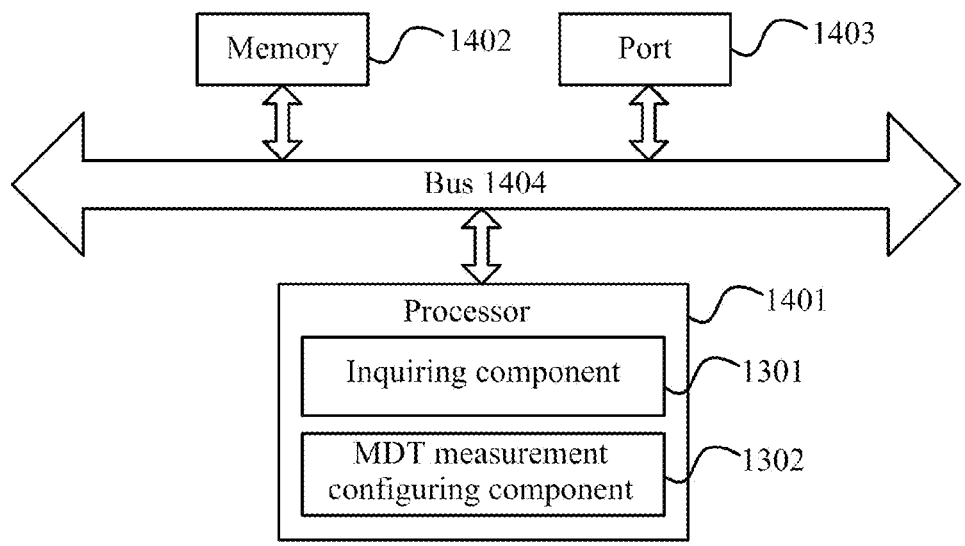
FIG. 14 is a schematic diagram of a hardware structure of a base station device provided by an embodiment of the present invention.

FIG. 14 is a schematic diagram of a hardware structure of a base station device provided by an embodiment of the present invention. As shown in FIG. 14, the base station device includes: a processor 1401, a memory 1402, at least one port 1403 and a bus 1404, where the processor 1401, the memory 1402 and the at least one port 1403 are interconnected through the bus 1404;

the memory 1402 stores machine readable instructions;
the processor 1401 executes the machine readable instructions to implement the following operations:
inquiring a PLMN list of a target user equipment for performing MDT measurement, namely MDT PLMN LIST, after receiving a Trace Start message sent by an MME; and when the PLMN list of the target user equipment for performing the MDT measurement is not inquired, sending a Trace Start failure message to the MME, or configuring the target user equipment to perform the MDT measurement under the current PLMN of the target user equipment.

The at least one port 1403 is configured to receive the Trace Start message sent by the MME and send the Trace Start failure message to the MME.

Further, the Trace Start failure message carries a failure reason, and the failure reason is that the PLMN list of the user equipment for performing the MDT measurement is not inquired.

Thus it can be seen that, when the machine readable instructions in the memory 1402 is executed by the processor 1401, the functions of the foregoing inquiring component 1301 and the MDT measurement configuring component 1302 may be achieved.

Figure 15A:
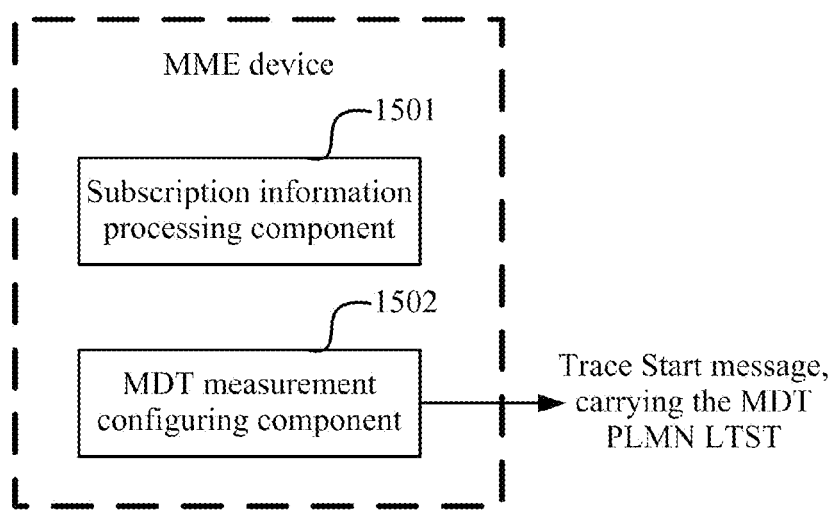
FIG. 15A is a schematic structural diagram of an MME device provided by another embodiment of the present invention.

FIG. 15A is a schematic structural diagram of an MME device provided by another embodiment of the present invention. As shown in FIG. 15A, the MME device may include:

a subscription information processing component 1501 configured to, after receiving a notification of change of subscription information of a user equipment, store user consent information used for indicating that the user equipment is allowed to perform MDT measurement and a PLMN list of the user equipment for performing the MDT measurement, namely MDT PLMN LIST, which are carried in the notification; and an MDT measurement configuring component 1502 configured to, after receiving a notification of activating the MDT measurement of the user equipment, if finding out that the user equipment changes from performing no MDT measurement into being allowed to perform the MDT measurement, and refuse to send a Trace Start message to a serving base station of the user equipment, or send the Trace Start message carrying the PLMN list of the user equipment for performing the MDT measurement to the serving base station of the user equipment.

Further, the subscription information processing component 1501 is further configured to: after receiving the notification of change of the subscription information of the user equipment, store the historical user consent information of the user equipment performing no MDT measurement, or set a user consent change mark, in order to indicate the user consent information of the user equipment changes from performing no MDT measurement into being allowed to perform the MDT measurement when the UE is at a connected state. Correspondingly, the MDT measurement configuring component 1502 is further configured to: find out that the user consent information of the user equipment changes from performing no MDT measurement into being allowed to perform the MDT measurement, by inquiring the current user consent information and the historical user consent information of the user equipment, or by inquiring the user consent change mark.

Figure 15B:
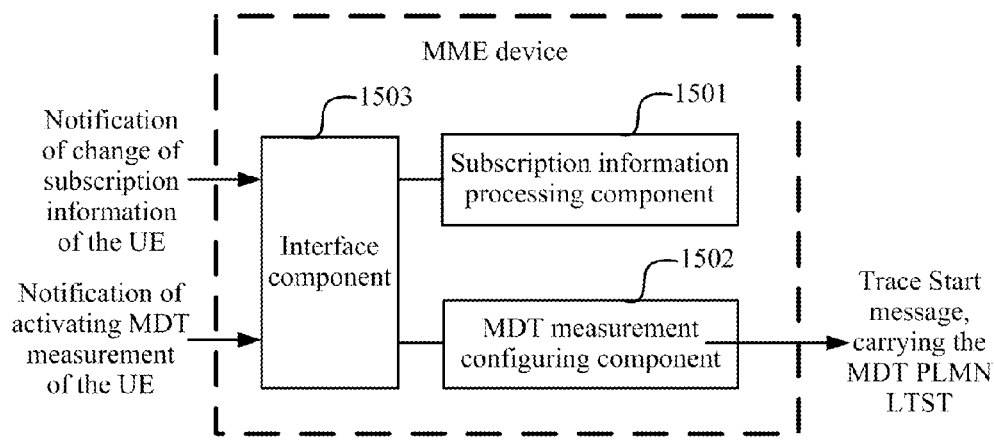
FIG. 15B is a schematic structural diagram of an MME device provided by another embodiment of the present invention.

Further, as shown in FIG. 15B, the MME device may further include an interface component 1503, configured to receive the notification of change of the subscription information of the user equipment and receive the notification of activating the MDT measurement of the user equipment; the interface component 1503 communicates with an HSS.

Figure 16:
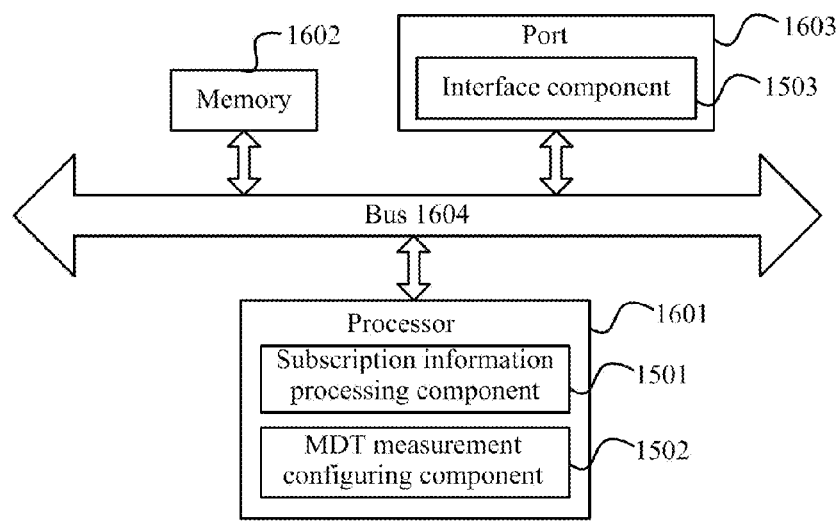
FIG. 16 is a schematic diagram of a hardware structure of an MME device provided by another embodiment of the present invention.

FIG. 16 is a schematic diagram of a hardware structure of an MME device provided by an embodiment of the present invention. As shown in FIG. 16, the MME device includes: a processor 1601, a memory 1602, at least one port 1603 and a bus 1604, where the processor 1601, the memory 1602 and the at least one port 1603 are interconnected through the bus 1604;

the memory 1602 stores machine readable instructions;

the processor 1601 executes the machine readable instructions to implement the following operations:

after receiving a notification of change of subscription information of a user equipment, storing user consent information used for indicating that the user equipment is allowed to perform MDT measurement and a PLMN list of the user equipment for performing the MDT measurement, namely MDT PLMN LIST, which are carried in the notification; and after receiving a notification of activating the MDT measurement of the user equipment, if finding out that the user equipment changes from performing no MDT measurement into being allowed to perform the MDT measurement, refusing to send a Trace Start message to a serving base station of the user equipment, or sending the Trace Start message carrying the PLMN list of the user equipment for performing the MDT measurement to the serving base station of the user equipment.

The processor 1601 executes the machine readable instructions stored in the memory 1602 to further implement the following operations:

after receiving the notification of change of the subscription information of the user equipment, storing the historical user consent information of the user equipment performing no MDT measurement, or setting a user consent change mark, in order to indicate the user consent information of the user equipment changes from performing no MDT measurement into being allowed to perform the MDT measurement when the UE is at a connected state; and finding out that the user consent information of the user equipment changes from performing no MDT measurement into being allowed to perform the MDT measurement, by inquiring the current user consent information and the historical user consent information of the user equipment, or by inquiring the user consent change mark.

The at least one port 1603 is configured to receive the notification of change of the subscription information of the user equipment and receive the notification of activating the MDT measurement of the user equipment.

Thus it can be seen that, when the machine readable instructions in the memory 1602 is executed by the processor 1601, the functions of the foregoing subscription information processing component 1501 and the MDT measurement configuring component 1502 may be achieved, and the functions of the interface component 1503 are achieved by the at least one port 1603.

The components in the above-mentioned embodiments of the present invention may be integrated and may also be separately deployed; namely, may be combined into one component and may also be further divided into multiple subcomponents.

The components in the above-mentioned embodiments of the present invention may be achieved by software (e.g., the machine readable instructions stored in the memory and implemented by the processor), may also be achieved by hardware (e.g., a processor of an Application Specific Integrated Circuit (ASIC), or achieved by the combination of the software and the hardware. Embodiments of the present invention are not specifically limited. For example, one hardware component may include a specially designed permanent circuit or logic device (e.g., a dedicated processor, such as FPGA or ASIC) for completing particular operations. The hardware component may also include a programmable logic device or circuit (e.g., including a general purpose processor or other programmable processors) temporarily configured by the software, for implementing particular operations. Whether the hardware component is specifically achieved by adopting a mechanical manner, or a dedicated permanent circuit, or a temporarily configured circuit (e.g., being configured by the software) may be determined based on the consideration of cost and time.

In summary, embodiments of the present invention support the processing of the following scenario from the standard: when initially accessing to the network, the UE does not agree to perform the MDT measurement, when the UE is at the connected state, the subscription information changes, and the UE agrees to perform the MDT measurements. Under this scenario, by adopting embodiments of the present invention, the MME and the eNB avoid wrong configuration operation; in the case of operation failure, the network side may acquire the failure reason so as to correctly process the failure.

By means of the description of the above-mentioned embodiments, it can be clearly understood by those skilled in the art that the present invention may be implemented by software plus a necessary universal hardware platform, of course, may be implemented by hardware, but the former is a preferable embodiment under most conditions. Based on this understanding, the technical solutions of the present invention are essentially or the part contributing to the prior art may be embodied in the form of a software product, the computer software product is stored in a storage medium, and includes several instructions for instructing a terminal device (may be a mobile phone, a personal computer, a server, or a network device and so on) to implement the methods in embodiments of the present invention, where the storage medium may be a magnetic disk, an optical disk, a read-only memory (ROM) or a Random Access Memory (RAM) or the like.

The drawings in embodiments of the present invention are merely some embodiments, and the components and operations therein are not necessary in the present invention. The components may be combined into one component or further divided into multiple subcomponents.

The foregoing descriptions are merely preferred embodiments of the present invention, it should be noted that, those of ordinary skill in the art may make various improvements and modifications without departing from the principle of the present invention, and these improvements and modifications shall fall within the protection scope of the present invention.

The invention claimed is:

1. A method for performing Minimization of Drive-Tests, MDT, measurement configuration, comprising:

storing, by a Mobility Management Entity, MME, a Public Land Mobile Network, PLMN, list of a user equipment for performing MDT measurement carried in a notification of change of subscription information of the user equipment, after receiving the notification; and sending, by the MME, a Trace Start message to a serving base station of the user equipment, after receiving a notification of activating the MDT measurement of the user equipment, wherein the PLMN list of the user equipment for performing the MDT measurement is carried in the Trace Start message.

2. The method according to claim 1, wherein the method further comprises:
performing, by the serving base station of the user equipment, MDT measurement configuration on the user equipment, according to the PLMN list of the user equipment for performing the MDT measurement carried in the Trace Start message, after receiving the Trace Start message.

3. The method according to claim 1, wherein before the MME receives the notification of change of the subscription information of the user equipment, the method further comprises:
when learning that the subscription information of the user equipment at a connected state is updated from performing no MDT measurement to performing the MDT measurement, sending, by a Home Subscriber Server, HSS, a notification of change of the subscription information of the user equipment to the MME, wherein the notification carries the PLMN list of the user equipment for performing the MDT measurement.

4. A Mobility Management Entity, MME, device, comprising:
a subscription information processing component configured to store a Public Land Mobile Network, PLMN, list of the user equipment for performing Minimization of Drive-Tests, MDT, measurement carried in a notification of change of subscription information of a user equipment, after receiving the notification; and
an MDT measurement configuring component configured to, send a Trace Start message to a serving base station of the user equipment, after receiving a notification of activating the MDT measurement of the user equipment, wherein the PLMN list of the user equipment for performing the MDT measurement is carried in the Trace Start message.

5. The MME device according to claim 4, further comprising:
an interface component, configured to receive the notification of change of the subscription information of the user equipment and the notification of activating the MDT measurement of the user equipment.

6. A method for performing Minimization of Drive-Tests, MDT, measurement configuration, comprising:
after receiving a notification of change of subscription information of a user equipment, storing, by a Mobility Management Entity, MME, current user consent information used for indicating that the user equipment is allowed to perform MDT measurement and a Public Land Mobile Network, PLMN, list of the user equipment for performing the MDT measurement, which are carried in the notification; and after receiving a notification of activating the MDT measurement of the user equipment, finding out, by the MME, that the subscription information of the user equipment changes from performing no MDT measurement into being allowed to perform the MDT measurement, refusing to send a Trace Start message to a serving base station of the user equipment, or sending the Trace Start message carrying the PLMN list of the user equipment for performing the MDT measurement to the serving base station of the user equipment.

7. The method according to claim 6, wherein after the MME receives the notification of change of the subscription information of the user equipment, the method further comprises:
storing historical user consent information indicating that the user equipment performs no MDT measurement, or setting a user consent change mark, wherein the user consent change mark is used for indicating that the user consent information of the user equipment changes from performing no MDT measurement into being allowed to perform the MDT measurement when the user equipment is at the connected state;
the finding out that the subscription information of the user equipment changes from performing no MDT measurement into being allowed to perform the MDT measurement, comprising:
finding out, by the MME, that the user consent information of the user equipment changes from performing no MDT measurement into being allowed to perform the MDT measurement, by inquiring the current user consent information and the historical user consent information of the user equipment, or by inquiring the user consent change mark.

8. The method according to claim 6, further comprising:
performing, by the serving base station of the user equipment, MDT measurement configuration on the user equipment according to the PLMN list of the user equipment for performing the MDT measurement carried in the Trace Start message, after receiving the Trace Start message.

9. The method according to claim 6, wherein before the MME receives the notification of change of the subscription information of the user equipment, the method further comprises:
when learning that the subscription information of the user equipment at a connected state is updated from performing no MDT measurement to being allowed to perform the MDT measurement, sending, by a Home Subscriber Server, HSS, the notification of change of the subscription information of the user equipment to the MME, wherein the notification carries the current user consent information used for indicating that the user equipment is allowed to perform the MDT measurement and the PLMN list of the user equipment for performing the MDT measurement.

* * * * *